US008821999B2

(12) United States Patent
Grzybowski et al.

(10) Patent No.: US 8,821,999 B2
(45) Date of Patent: Sep. 2, 2014

(54) VACUUM-INSULATED GLASS WINDOWS WITH GLASS-BUMP SPACERS

(75) Inventors: Richard R Grzybowski, Corning, NY (US); Daniel R Harvey, Bath, NY (US); Stephan Lvovich Logunov, Corning, NY (US); Daniel Louis Gabriel Ricoult, Horseheads, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 70 days.

(21) Appl. No.: 12/265,192

(22) Filed: Nov. 5, 2008

(65) Prior Publication Data

US 2010/0107525 A1     May 6, 2010

(51) Int. Cl.
*E06B 3/00*     (2006.01)
*E04C 2/54*     (2006.01)
*E06B 3/663*    (2006.01)
*E06B 3/66*     (2006.01)

(52) U.S. Cl.
CPC ............. *E06B 3/66304* (2013.01); *Y02B 80/24* (2013.01); *E06B 3/6612* (2013.01)
USPC ........................... 428/34; 428/120; 52/786.13

(58) Field of Classification Search
USPC ............... 428/34, 120; 52/786.13; 264/482
See application file for complete search history.

(56) References Cited

U.S. PATENT DOCUMENTS

| | | | | |
|---|---|---|---|---|
| 1,370,974 A | * | 3/1921 | Kirlin | 428/34 |
| 1,770,200 A | * | 7/1930 | Comstock | 52/576 |
| 4,683,154 A | | 7/1987 | Benson et al. | 428/34 |
| 5,027,574 A | | 7/1991 | Phillip | 52/171 |
| 5,247,390 A | * | 9/1993 | Hed | 359/599 |
| 5,270,084 A | * | 12/1993 | Parker | 428/34 |
| 5,379,149 A | | 1/1995 | Snitzer et al. | 359/341 |
| 5,794,404 A | | 8/1998 | Kim | |

(Continued)

FOREIGN PATENT DOCUMENTS

| | | | |
|---|---|---|---|
| CN | 1660709 | 8/2005 | ............. C03B 23/24 |
| EP | 0047725 | 12/1985 | |

(Continued)

OTHER PUBLICATIONS

Chino, "Revolutionary Super-Insulating Vacuum Glass!", http://www.inhabitat.com/2008/03/24/guardian-develops-hyper-insulating-vacuum-glass/, 2008.

(Continued)

*Primary Examiner* — Donald J Loney
(74) *Attorney, Agent, or Firm* — Ryan T. Hardee

(57) ABSTRACT

Vacuum-insulated glass (VIG) windows (10) that employ glass-bump spacers (50) and two or more glass panes (20) are disclosed. The glass-bump spacers are formed in the surface (24) of one of the glass panes (20) and consist of the glass material from the body portion (23) of the glass pane. Thus, the glass-bump spacers are integrally formed in the glass pane, as opposed to being discrete spacer elements that need to be added and fixed to the glass pane. Methods of forming VIG windows are also disclosed. The methods include forming the glass-bump spacers by irradiating a glass pane with a focused beam (112F) from a laser (110). Heating effects in the glass cause the glass to locally expand, thereby forming a glass-bump spacer. The process is repeated at different locations in the glass pane to form an array of glass-bump spacers. A second glass pane is brought into contact with the glass-bump spacers, and the edges (28F, 28B) sealed. The resulting sealed interior region (40) is then evacuated to a vacuum pressure of less than one atmosphere.

17 Claims, 9 Drawing Sheets

(56) References Cited

U.S. PATENT DOCUMENTS

| | | | |
|---|---|---|---|
| 5,840,239 A | 11/1998 | Partanen et al. | 264/401 |
| 5,877,103 A | 3/1999 | Dupont et al. | 501/71 |
| 6,291,036 B1 | 9/2001 | Wang et al. | |
| 6,472,295 B1 | 10/2002 | Morris et al. | 438/463 |
| 2005/0132662 A1 | 6/2005 | Hornung et al. | 52/202 |
| 2007/0201797 A1 | 8/2007 | Grzybowski et al. | 385/52 |

FOREIGN PATENT DOCUMENTS

| | | | |
|---|---|---|---|
| EP | 1 077 302 A2 | 2/2001 | |
| JP | S52 (1977)-126511 | 10/1977 | F04B 23/02 |
| WO | WO 94/24398 | * 10/1994 | |
| WO | 99/45225 | 9/1999 | |
| WO | 2007/141583 A1 | 12/2007 | |

OTHER PUBLICATIONS

Nippon Sheet Glass Spacia, http://www.nsg-spacia.co.jp/tech/index.html, printed Nov. 5, 2008.

Friedl, "FAQ/Info VIG + ProVIG", http://www.vig-info.de/ProjektProVig/FAQ-VIG.htm, updated Oct. 2008.

* cited by examiner

VACUUM-INSULATED GLASS WINDOWS WITH GLASS-BUMP SPACERS

FIELD OF THE INVENTION

The present invention relates generally to vacuum-insulated glass windows, and in particular to such windows that employ glass-bump spacers.

BACKGROUND ART

Vacuum-insulated glass (VIG) windows typically consist of two or more glass panes with a vacuum in between, which provides improved thermal and noise insulating properties as compared to ordinary glass windows. To prevent sagging of the glass panes, discrete spacers are placed between the glass panes to prevent the panes from contacting each other. The spacers are typically made of aluminum, plastic, ceramic, or glass and are distinct from the glass panes, i.e., they are discrete elements disposed and fixed between the glass panes.

While present-day spacers are effective in separating the panes, they tend to be visible when looking through the window, thereby making the window unsightly. In addition, the need to dispose the discrete spacers between the panes and then fix the spacers to the panes adds cost and complexity to the VIG window manufacturing process.

SUMMARY

A first aspect of the present invention is a VIG window. The VIG window includes a first glass pane having a first body formed from a first glass material and having first opposite surfaces and a first outer edge. The VIG window also includes a second glass pane spaced apart from and disposed substantially parallel to the first glass pane at a first distance and having a second body formed from a second glass material and having second opposite surfaces and a second outer edge. A first edge seal is formed around the respective first and second outer edges so as to define a first sealed interior region between the first and second glass panes, wherein the first sealed interior region has a vacuum pressure of less than one atmosphere. The VIG window further includes a first plurality of glass-bump spacers integrally formed with the first glass pane in one of the first surfaces and consisting of the first glass material from the first body portion, and contacting the second glass pane so as to maintain the spaced apart first distance.

Another aspect of the invention is a method of forming a VIG window. The method includes, in a first glass pane having a first body portion with a first surface and a first edge and comprising a first glass material, integrally forming in the first surface a first plurality of glass-bump spacers consisting of the first glass material from the first body portion. The method also includes bringing a second glass pane having a second body portion with a second surface and a second edge and comprising a second glass material in contact with the first plurality of glass-bump spacers so that the first and second glass panes are spaced apart by a first distance between the first and second surfaces. The method additionally includes sealing the first and second edges to define an interior region between the first and second glass panes, and then forming a vacuum pressure of less than one atmosphere in the interior region.

Another aspect of the invention is a VIG window product formed by a process that includes providing a first glass pane having a first body portion with a first surface and a first edge and comprising a first glass material, and forming in the first glass pane first surface a plurality of glass-bump spacers that consist of the first glass material from the first body portion. The process also includes bringing a second glass pane having a second body portion with a second surface and a second edge and comprising a second glass material in contact with the glass-bump spacers so that the first and second glass panes are spaced apart by a first distance between the first and second surfaces. The process further includes sealing the first and second edges to define an interior region between the first and second glass panes. The process also includes forming a vacuum pressure of less than one atmosphere in the interior region.

Additional aspects, features and advantages of the invention are set forth in the detailed description that follows and, in part, will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and, together with the description, serve to explain the principles and operations of the invention.

DETAILED DESCRIPTION

For purposes of description herein, the terms "front," "back," "middle," and derivatives thereof are relative terms used to facilitate describing the apparatus and methods of the invention. Accordingly, it is to be understood that the invention may assume various alternative orientations and step sequences, except where expressly specified to the contrary. It is also to be understood that the specific devices and processes illustrated in the attached drawings and described in the following specification are embodiments of the inventive concepts defined in the appended claims. Hence, specific dimensions and other physical characteristics relating to the embodiments disclosed herein are not to be considered as limiting, unless the claims expressly state otherwise.

The term "photo-induced absorption" is broadly understood to mean a local change of the absorption spectrum of a glass pane resulting from locally exposing (irradiating) the glass pane with optical radiation. Photo-induced absorption may involve a change in absorption at a wavelength or a range of wavelengths, including, but not limited to, ultra-violet, near ultra-violet, visible, near-infrared, and/or infrared wavelengths. Examples of photo-induced absorption in a transparent glass pane include, for example and without limitation, color-center formation, transient glass defect formation, and permanent glass defect formation.

The description of the glass-bump spacers being "formed in" a glass pane means that the glass-bump spacers grow out of the body portion of the glass pane and are formed from the glass material making up the glass pane, so as to outwardly protrude in a convex manner from the otherwise substantially flat glass-pane surface.

As used herein, a window is an article comprising two or more glass panes that are at least partially transparent to electromagnetic (EM) radiation, including EM radiation having ultra-violet, near ultra-violet, visible, near-infrared, and/or infrared wavelengths.

VIG Windows with Integrally Formed Glass-Bumps

Figures 1, 2:
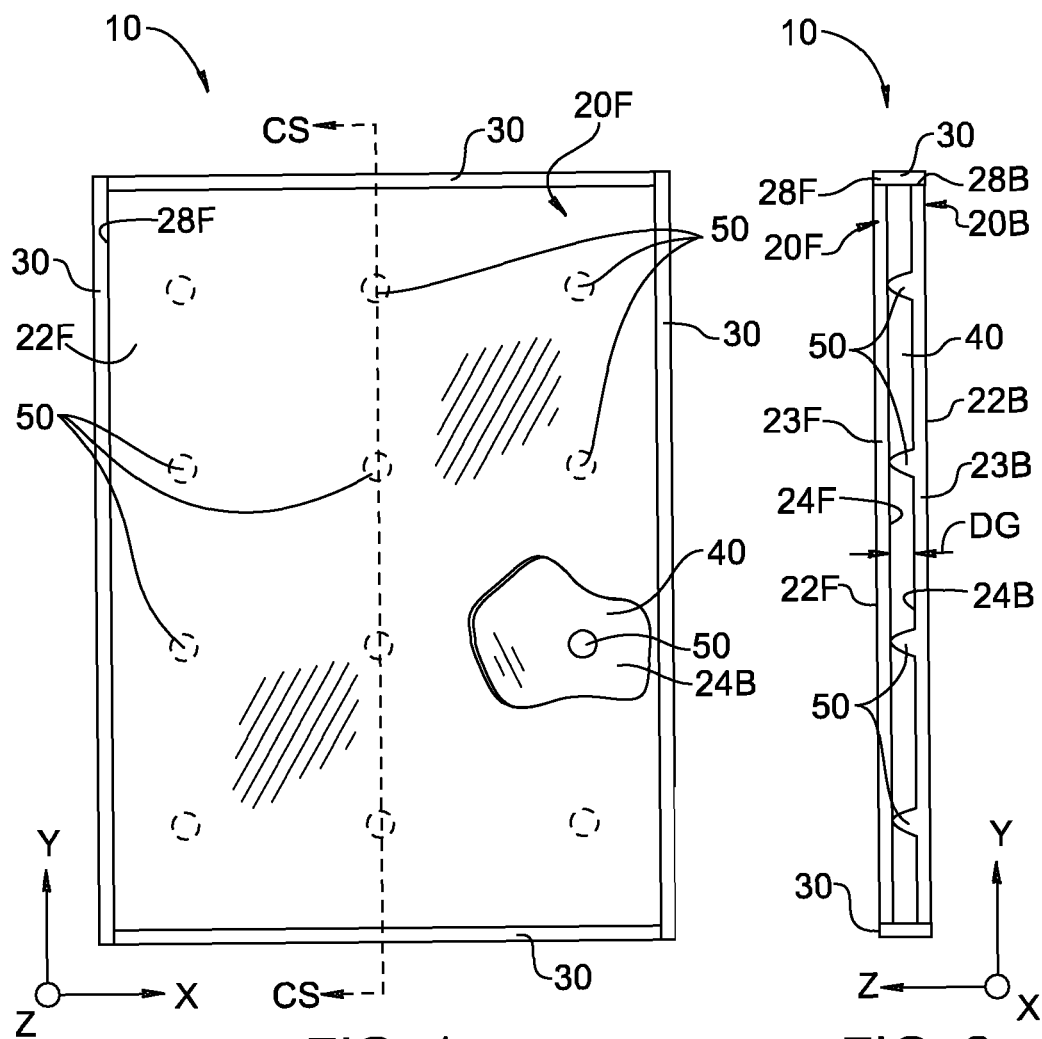
FIG. 1 is a front-on view of an example two-pane VIG window according to the present invention.
FIG. 2 is a cross-sectional view of the VIG window of FIG. 1 as viewed in the direction CS-CS.

FIG. 1 is a front-on view of an example embodiment of a two-pane VIG window 10 according to the present invention. FIG. 2 is a cross-sectional view of the example VIG window 10 of FIG. 1 as viewed in the direction CS-CS. Cartesian coordinates are shown for the sake of reference. VIG window 10 includes two glass panes 20, namely a front glass pane 20F and a back glass pane 20B disposed opposite to and substantially parallel to one another. Front glass pane 20F has a body portion 23F made of a first glass material and has outer and inner surfaces 22F and 24F and an outer edge 28F. Likewise, back glass pane 20B has a body portion 23B made of a second glass material and has outer and inner surfaces 22B and 24B and an outer edge 28B. In an example embodiment, the first and second glass materials making up body portions 23F and 23B are the same.

Front and back glass panes 20F and 20B are separated by a distance $D_G$ as measured from their respective inner surfaces 24F and 24B. An edge seal 30 is provided at respective outer edges 28F and 28B to surround at least a portion of each outer edge to provide a hermetic seal. Edge seal 30 and front and back glass pane inner surfaces 24F and 24B define a sealed interior region 40. Sealed interior region 40 is preferably at least partially evacuated so that it has a vacuum pressure of less than one atmosphere, which provides VIG window 10 with desirable thermal and acoustic insulation properties.

Figure 3:
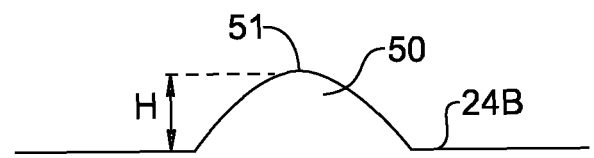
FIG. 3 is a close-up cross-sectional view of an example glass-bump spacer.

VIG window 10 further includes a plurality of glass-bump spacers 50 integrally formed in inner surface 24B of back glass pane 20B. FIG. 3 is a close-up view of an example glass-bump spacer 50. Note that glass-bump spacers 50 are integrally formed in back glass pane 20B and are not added as separate or discrete elements to VIG window 10. Thus, glass-bumps 50 are formed from (and thus consist of) the same material as back glass pane 20B, and in fact are extensions of body portion 23B. Example methods of forming glass-bumps 50 are discussed in detail below.

In an example embodiment, glass-bump spacers 50 are regularly spaced with respect to one another. Because glass-bump spacers 50 are integrally formed in body portion 23B, they are substantially invisible when VIG window 10 is viewed at regular (i.e., substantially normally incident) viewing angles. Consequently, glass-bumps 50 are shown in phantom in FIG. 1. Glass-bump 50 has a "tip" or "top portion" 51, as shown in FIG. 3. As discussed below, top portion 51 need not be rounded as is shown in FIG. 3. Glass-bump spacers 50 contact front pane inner surface 24F and serve to maintain the separation distance $D_G$ between front and back glass panes 20F and 20B.

In an example embodiment, glass panes 20F and 20B are formed from panes of soda-lime glass, which further in an example embodiment have a thickness $T_G$ between 2 mm and 3 mm. In an example embodiment, glass-bump spacers 50 formed in soda-lime glass have a height ("bump height") H in the range from 75 μm to 170 μm, more preferably in the range from 100 μm to 170 μm, and even more preferably in the range from 150 μm to 170 μm. In an example embodiment, glass panes 20F and 20B have substantially the same thickness $T_G$ (see FIG. 6).

Figure 4A:
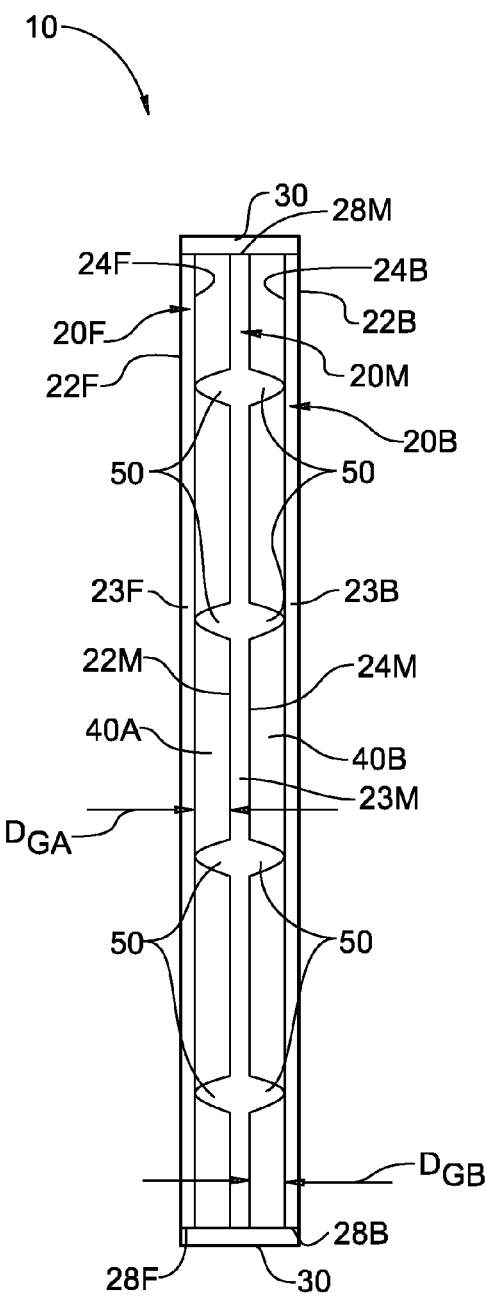
FIG. 4A is a cross-sectional view similar to FIG. 2 and that illustrates an example embodiment of a three-pane VIG window having a middle glass pane with glass-bump spacers formed in both surfaces of the middle pane.

FIG. 4A is a cross-sectional view similar to FIG. 2 and illustrates an example embodiment of a three-pane VIG window 10 that includes a middle glass pane 20M sandwiched between front pane 20F and back pane 20B. Middle glass pane 20M has a body portion 23M of a third glass material and has a front side 22M, a back side 24M and an edge 28M. First and second sets of glass-bump spacers 50 are respectively formed in both the front and back sides 22M and 24M of middle pane 20M and respectively serve to maintain distance $D_{GA}$ between middle glass pane 20M and front pane 20F, and distance $D_{GB}$ between the middle pane and back pane 20B. In the example embodiment shown in FIG. 4A, a single edge seal 30 serves to seal edges 28F, 28M and 28B. In another example embodiment, multiple edge seals 30 are used, where one edge seal serves to seal at least respective portions of edges 28F and 28M, and the other edge seal serves to seal at least respective portions of edges 28M and 28B (see FIG. 4B).

Edge seal 30 and glass pane surfaces 24F and 22M define a first sealed interior region 40A, while edge seal 30 and glass pane surfaces 24M and 24B define a second sealed interior region 40B. Sealed interior regions 40A and 40B are preferably evacuated so that they each have a vacuum pressure of less than one atmosphere, which provides triple-pane VIG window 10 with desirable thermal insulation and acoustic properties, and in particular with about twice the insulation of a two-pane VIG window 10 such as shown in FIG. 1 and FIG. 2.

Figure 4B:
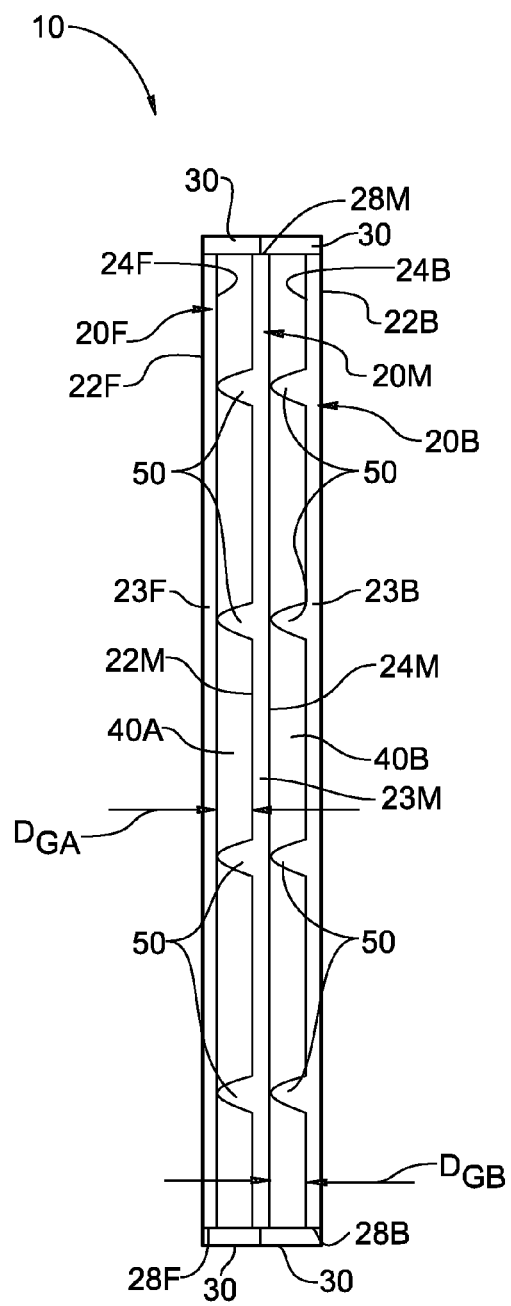
FIG. 4B is similar to FIG. 4A, except that the second set of glass-bump spacers are formed in the back glass pane rather than the middle glass pane.

FIG. 4B is similar to FIG. 4A, and illustrates an alternate example embodiment of three-pane VIG window 10, wherein the second set of glass-bump spacers 50 are formed in inner surface 24B of back glass pane 20B rather than in the middle glass pane 20M. FIG. 4B also illustrates an example embodiment where multiple edge seals 30 are used, as described above.

In an example embodiment, middle glass pane 20M is formed from soda-lime glass, and further in an example embodiment has a thickness $T_G$ between 2 mm and 3 mm. In an example embodiment, the front, middle and back glass pane body portions 23F, 23M and 23B are made of the same glass material.

While soda-lime glass is the most common window glass, the VIG window invention disclosed herein can be applied to any type of glass in which integral glass-bump spacers 50 can be formed using the methods described in detail below. For example, the VIG window invention disclosed herein applies to low-iron ("ultra-clear") window glasses, as well as to the other glasses introduced and discussed below.

Glass-Bump Spacer Formation

Figure 5A:
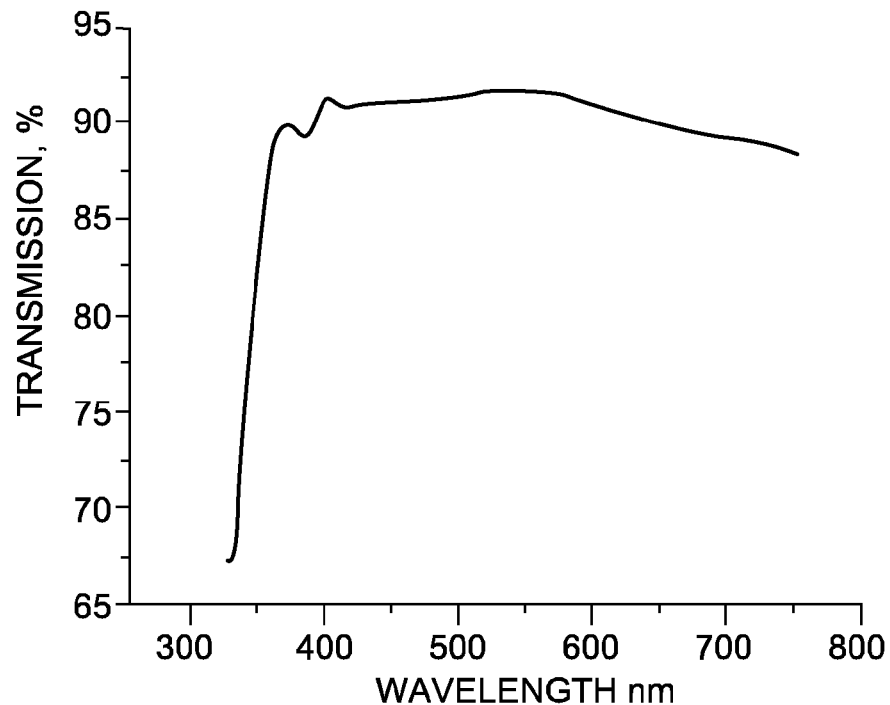
FIG. 5A and FIG. 5B illustrate typical transmission curves (transmission (%) vs. wavelength (nm)) in the UV and visible wavelength spectrums for transparent alkaline earth aluminosilicate glasses (FIG. 5A) and transparent soda-lime glasses (FIG. 5B)
Figure 5B:
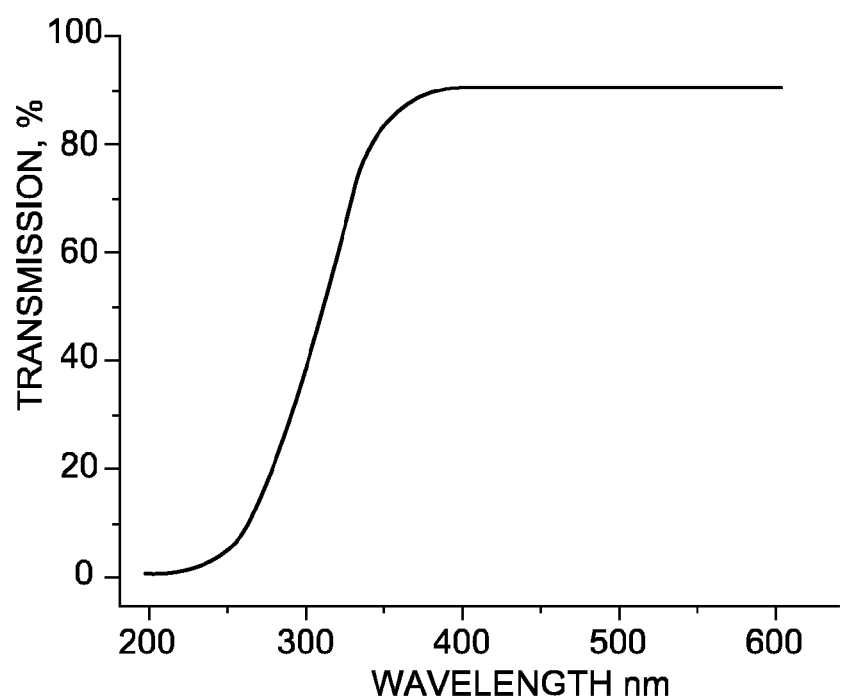

Available transparent glasses used for window panes tend to have very little absorption at wavelengths where high-power lasers are available, such as the near-infrared (NIR) band between about 800 μm and 1600 μm, or in the ultraviolet (UV) band between about 340 nm and about 380 nm. For example, alkaline earth aluminosilicate glasses and sodium aluminosilicate glasses (e.g., glass such as Eagle$^{2000}$® glass, EagleXG™ glass, 1317 glass, and Gorilla™ glass, all available from Corning Incorporated, Corning, N.Y.) typically have a transmission spectra as shown in FIG. 5A, and soda-lime glass typically has a transmission spectra as shown in FIG. 5B. As evident from FIG. 5A and FIG. 5B, the transmission of alkaline earth aluminosilicate and soda-lime glasses is more than about 85% (including Fresnel losses due to reflection at the glass/air interface) at a wavelength of 355 nm, which is insufficient for heating even small volumes of glass to temperatures close to a working point (~$10^5$ Poise) unless lasers with several hundred watts of available output power are used.

Unexpectedly, for certain transparent glass panes, including those formed from alkaline earth aluminosilicate glasses (e.g., LCD glasses such as the aforementioned Eagle 2000™ glass and Eagle XG™ glass), soda-lime glasses and sodium aluminosilicate glasses (e.g., the aforementioned 1317 glass and Gorilla™ glass), it has been found that absorption at the laser wavelength can be raised to a sufficient level by transmitting an intense UV laser beam through the transparent glass pane. In particular, a high repetition-rate, nanosecond-pulse-width UV laser was found to be the most effective. Several seconds of exposure with such a pulsed UV laser beam was found to result in photo-induced absorption in the otherwise relatively low-absorption transparent glass. This induced glass absorption significantly increases at the UV wavelength, making it possible to locally heat the glass pane to its working temperature (using the same laser or a separate laser) and enables the formation of glass-bump spacers 50. The UV-generated absorption fades over a short period of time (e.g., a few seconds) once the irradiation is terminated.

Other types of lasers, such as mid-infrared-wavelength lasers, can be used instead of a UV laser for most transparent glass materials. An example mid-infrared-wavelength laser generates a laser beam having a wavelength of about 2.7 μm. A UV laser is described and considered below in connection with the apparatus used to perform the methods of the present invention for the sake of illustration.

Figure 6:
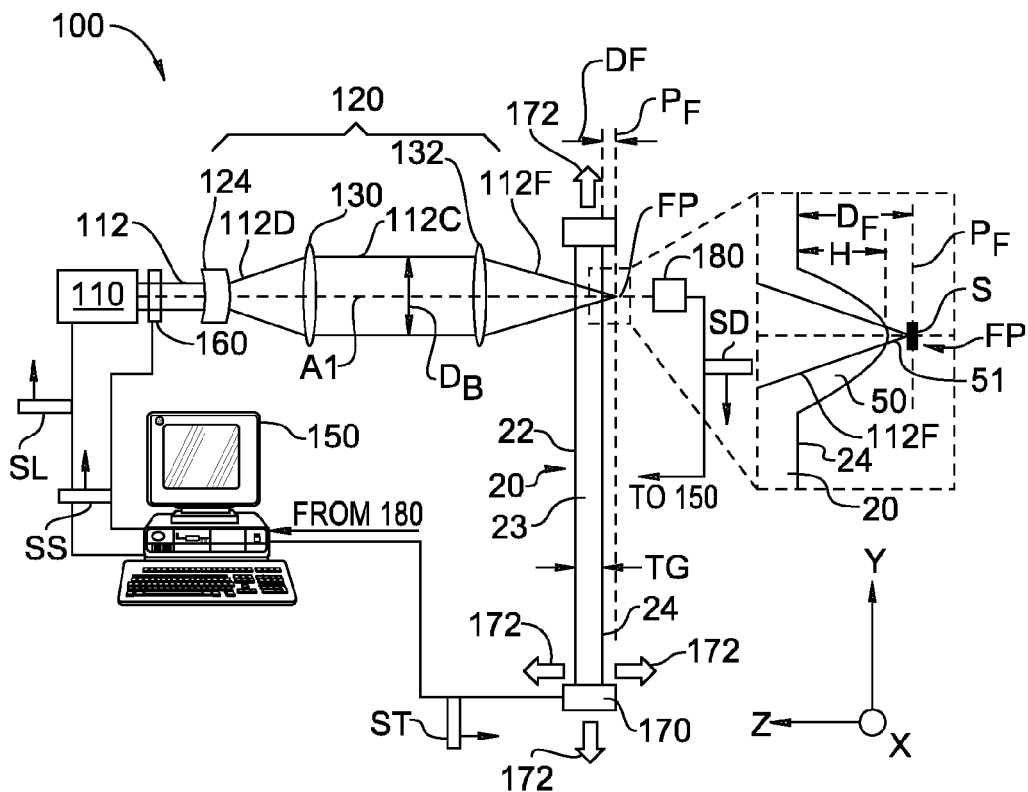
FIG. 6 is a schematic diagram of an example laser-based glass-bump-forming apparatus used to form glass-bump spacers in a glass pane in the process of forming a VIG window.

FIG. 6 is a schematic diagram of an example laser-based apparatus ("apparatus") 100 used to form glass-bump spacers 50 in a glass pane 20 in the process of forming VIG window 10. Apparatus 100 includes a laser 110 arranged along an optical axis A1. Laser 110 emits a laser beam 112 having power P along the optical axis. In an example embodiment, laser 110 operates in the ultraviolet (UV) region of the electromagnetic spectrum.

Figure 7:
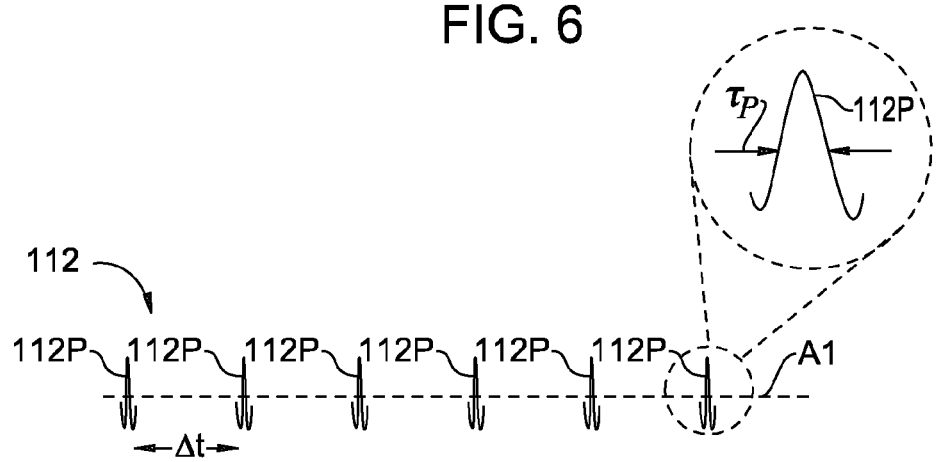
FIG. 7 is a schematic diagram of an example embodiment of a laser light beam as formed from light pulses from a pulsed laser.

With reference also to FIG. 7, in a particular example embodiment, laser 110 is a pulsed laser that generates light pulses 112P that constitute laser beam 112, wherein the light pulses have a UV wavelength (e.g., about 355 nm) and a nanosecond-scale temporal pulse width τP. In an example embodiment, light pulses 112P have a temporal pulse width τP in the range 20 ns≤τP≤80 ns, and a repetition rate R in the range 50 kHz≤R≤200 kHz. Further in the example embodiment, laser 110 is a 20-Watt laser (i.e., P=20 W). In an example embodiment, laser 110 comprises a third-harmonic Nd-based laser. As shown in FIG. 7, light pulses 112P are spaced apart in time by an amount Δt, thereby defining the repetition rate as R=1/Δt.

Apparatus 110 also includes a focusing optical system 120 that is arranged along optical axis A1 and defines a focal plane $P_F$ that includes a focal point FP. In an example embodiment, focusing optical system 120 includes, along optical axis A1 in order from laser 110: a combination of a defocusing lens 124 and a first focusing lens 130 (which combination forms a beam expander), and a second focusing lens 132. In an example embodiment, defocusing lens 124 has a focal length $f_D$=−5 cm, first focusing lens 130 has a focal length $f_{C1}$=20 cm, and second focusing lens 132 has a focal length $f_{C2}$=3 cm and a numerical aperture $NA_{C2}$=0.3. In an example embodiment, defocusing lens 124 and first and second focusing lenses 130 and 132 are made of fused silica and include anti-reflection (AR) coatings. Alternate example embodiments of focusing optical system 120 include mirrors or combinations of mirrors and lens elements configured to produce focused laser beam 112F from laser beam 112.

Apparatus 100 also includes a controller 150, such as a laser controller, a microcontroller, computer, microcomputer or the like, electrically connected to laser 110 and adapted to control the operation of the laser. In an example embodiment, a shutter 160 is provided in the path of laser beam 112 and is electrically connected to controller 150 so that the laser beam can be selectively blocked to turn the laser beam "ON" and "OFF" using a shutter control signal SS rather than turning laser 110 "ON" and "OFF" with a laser control signal SL.

Prior to initiating the operation of apparatus 100, glass pane 20, having a body portion 23 with a front surface 22 and back surface 24, is disposed relative to the apparatus. Specifically, glass pane 20 is disposed along optical axis A1 so that front and back glass pane surfaces 22 and 24 are substantially perpendicular to the optical axis so that back glass pane surface 24 is slightly axially displaced from focal plane $P_F$ in the direction towards laser 110 (i.e., in the +Z direction) by a distance $D_F$. In an example embodiment, glass pane 20 has a thickness $T_G$ in the range 1 mm≤$T_G$≤6 mm. Also in an example embodiment, 0.5 mm≤$D_F$≤2 mm. In this arrangement, glass-bump spacers are to be formed in glass pane surface 24, which corresponds to surface 24B of back glass pane 20B of FIG. 2.

Laser 110 is then activated via control signal SL from controller 150 to generate laser beam 112. If shutter 160 is used, then after laser 110 is activated, the shutter is activated and placed in the "ON" position via shutter control signal SS from controller 150 so that the shutter passes laser beam 112. Laser beam 112 is then received by focusing optical system 120, and defocusing lens 124 therein causes the laser beam to diverge to form a defocused laser beam 112D. Defocused laser beam 112D is then received by first focusing lens 130, which is arranged to form an expanded collimated laser beam 112C from the defocused laser beam. Collimated laser beam 112C is then received by second focusing lens 132, which forms a focused laser beam 112F. Focused laser beam 112F passes through glass pane 20 and forms a focus spot S along optical axis A1 at focal point FP, which, as mentioned above, is at distance $D_F$ from glass pane back surface 24 and thus resides outside of body portion 24. It is noted here that glass pane 20 slightly affects the position of focal point FP of optical system 20 because focused laser beam 112F converges as it passes through the glass pane. However, the thickness $T_G$ of glass pane 20 is typically sufficiently thin so that this focus-shifting effect can be ignored.

A portion of focused laser beam 112F is absorbed as it passes through glass pane 20 due to the aforementioned photo-induced absorption in the glass pane. This serves to locally heat glass pane 20. The amount of photo-induced absorption is relatively low, e.g., about 3% to about 4%. When focused light beam 112F is locally absorbed in glass pane 20, a limited expansion zone is created within body portion 23 in which the rapid temperature change induces an expansion of the glass. Since the expansion zone is constrained by unheated (and therefore unexpanded) regions of glass surrounding the expansion zone, the glass within the expansion zone is compelled to relieve internal stresses by deforming upward, thereby forming a glass-bump spacer 50. As shown in the inset of FIG. 6, glass-bump spacer 50 has a peak 51 corresponding to the location of the highest beam intensity. In an example embodiment, glass-bump spacer 50 is fixed by rapidly cooling the heated region of the glass. In an example embodiment, this fixing is accomplished by terminating the exposure with (i.e., the irradiation by) focused laser beam 112F.

If focused light beam 112F has a circularly symmetric cross-sectional intensity distribution, such as a Gaussian distribution, then the local heating and the attendant glass expansion occurs over a circular region in glass pane body 23, and the resulting glass-bump spacer 50 is substantially circularly symmetric.

In an example embodiment, a plurality of glass-bump spacers 50 are formed in glass pane 20 using the above method, and the glass pane is then used to form VIG window 10. In an example embodiment, apparatus 100 includes an X-Y-Z stage 170 electrically connected to controller 150 and configured to move glass pane 20 relative to focused laser beam 112F in the X, Y and Z directions, as indicated by large arrows 172. This allows for a plurality of glass-bump spacers 50 to be formed by selectively translating stage 170 via a stage control signal ST from controller 150 and irradiating different locations in glass pane 20.

In an example embodiment, glass-bump spacers 50 are formed in a regular array such as shown in FIG. 1. In an example embodiment, the spacing between adjacent glass-bump spacers 50 is between about 2 inches (i.e., about 5.08 cm) and 6 inches (i.e., about 15.24 cm). Also in an example embodiment, glass-bump spacer formation is controlled using a feedback device or system that tracks the growth of glass-bump spacers 50 so that the glass-bump spacers can be formed to have a select height H that is substantially uniform over the set of glass-bump spacers.

In one example embodiment, glass-bump spacer formation is tracked by measuring the transmission T of focused laser beam 112F through glass pane 20. In an example embodiment, this is accomplished by arranging a photodetector 180 along axis A1 at the output side of glass pane 20 and electrically connecting the photodetector to controller 150. It turns out that the transmission T of focused laser beam 112F rapidly decreases when a glass-bump 50 is formed. Accordingly, this rapid drop in transmission is detected by a change in an electrical detector signal SD generated by photodetector 180 in response to detecting transmitted light in focused laser beam 112F. Terminating the irradiation (exposure) with focused laser beam 112F (e.g., via the operation of controller 150 using control signals SL or SS as described above) stops the localized heating and fixes glass-bump spacer 50. In an example embodiment, the measured transmission T is used to control the irradiation dose.

In an example embodiment, photodetector 180 is arranged adjacent the input side of glass pane 20 and detects fluorescence from glass pane body 23 during the irradiation process. A threshold change in detected fluorescence is then used to terminate the exposure or to adjust the irradiation dose.

In another example embodiment, a feedback sub-system can be used to control the bump height of each glass-bump spacer by controlling the irradiating. For example, a feedback sub-system can be implemented to control the irradiating by monitoring one or more of a transmission intensity of the focused laser beam through the first glass pane, a temperature of each respective glass-bump spacer, a fluorescence intensity emanating from each respective glass-bump spacer, and a bump height of each respective glass-bump spacer, and terminating the irradiating when a predetermined value of the monitored variable is measured.

In another example embodiment, focusing optical system 120 is adapted for scanning so that focused laser beam 112F can be selectively directed to locations in glass pane 20 where glass-bump spacers 50 are to be formed.

Figure 8:
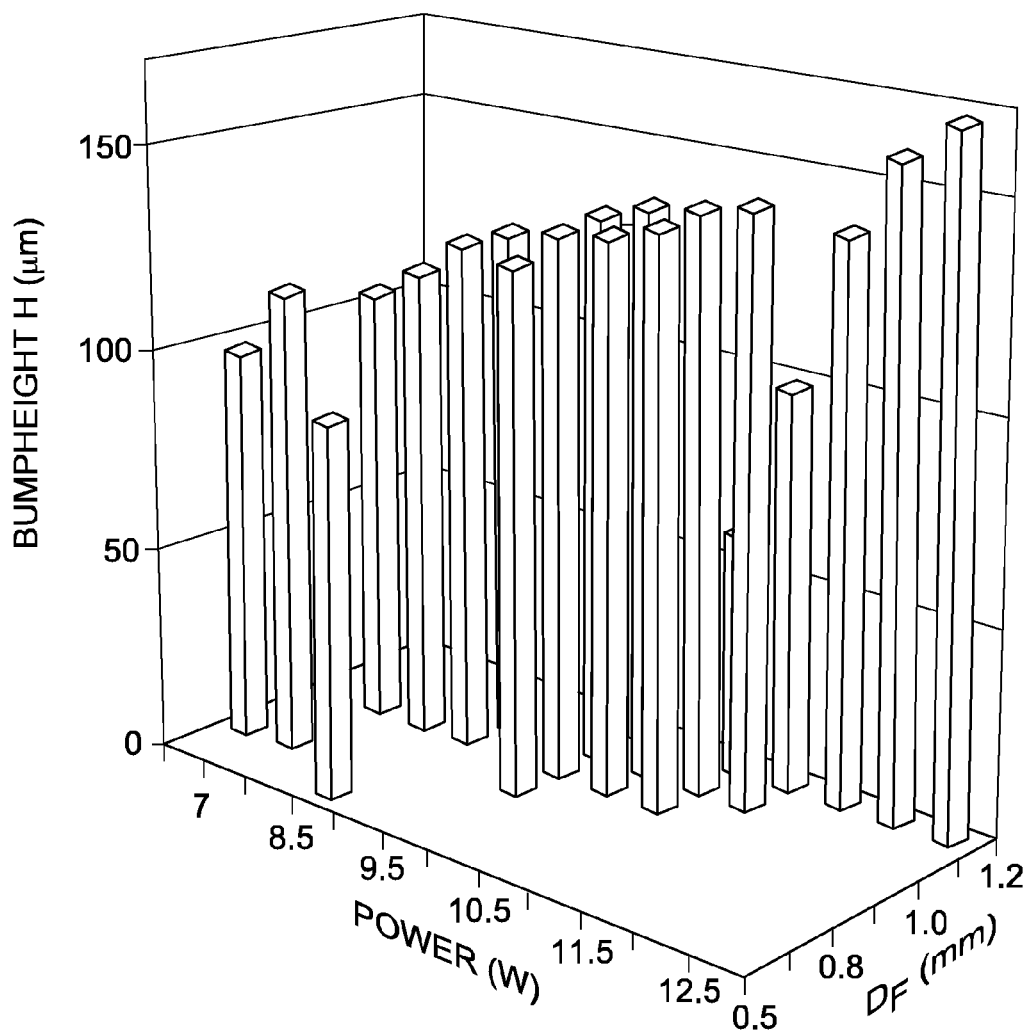
FIG. 8 is a bar graph that plots the laser power P (W), the distance $D_F$, and the glass-bump-spacer height H for a soda-lime glass pane, based on experimental data.

Bump height H depends in several factors, which include the laser power P, the repetition rate R, the focusing conditions, and the glass material making up glass pane 20. FIG. 8 is a bar graph that plots the laser power (W) in focused laser beam 112F, distance $D_F$ between focal plane $P_F$ and back glass pane surface 24, and bump height H for a glass pane made of soda-lime glass having a thickness $T_G$=3 mm. The bar graph of FIG. 8 is based in experimental data and provides an example range of operating parameters for forming glass-bump spacers 50 using apparatus 100 for the particular type of glass pane 20. The exposure (irradiation) time used ranged between 2 s to 2.5 and it was observed that this variation did not significantly affect the bump height H. The optimum repetition rate of the UV laser was found to be R=150 kHz. The bump height H ranged from about 75 µm for $D_F$ of about 0.6 mm and a laser power P of about 9 W to about 170 µm for $D_F$ of about 1.1 mm and a laser power of about 13 W.

Note that if bump heights H are too small, it could result in a reduction in the amount of vacuum that can be applied to interior region 40, leading to reduced insulation properties with too small a gap between adjacent glass panes 20. The smaller interior region volume that results also translates into reduced insulation properties. In addition, small bump heights H can give rise to the appearance of "Newton's rings" due to light interference between closely arranged glass surfaces. It is estimated that a bump height H≥100 µm is sufficient to overcome these two potential problems for most VIG windows 10.

Figure 9:
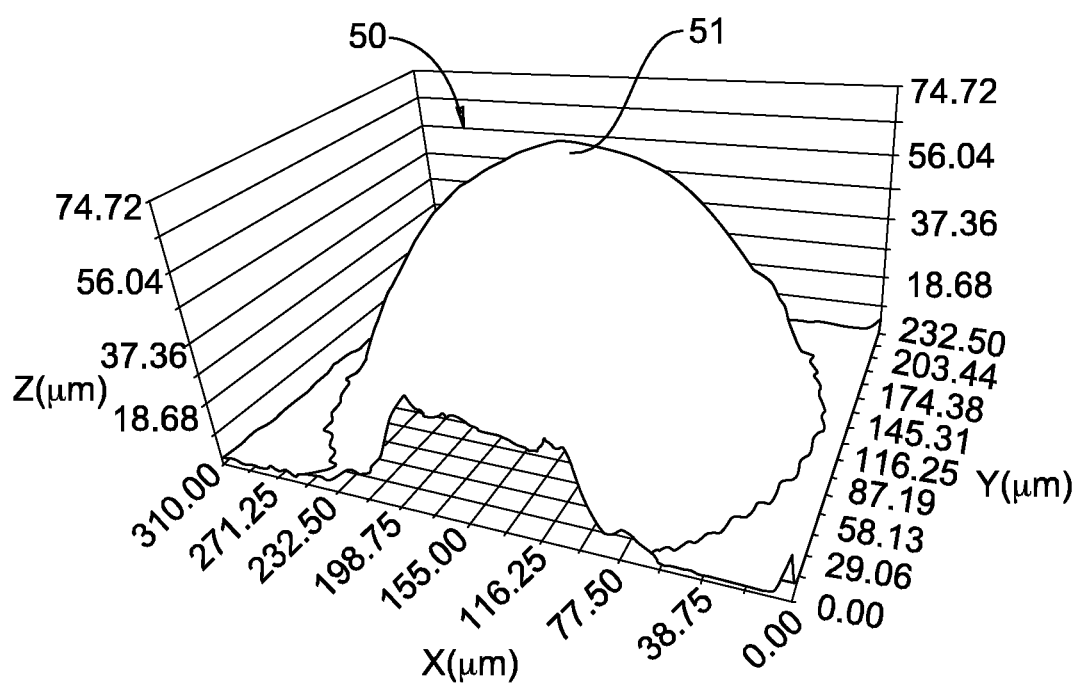
FIG. 9 is a three-dimensional image of a glass-bump spacer formed in a 3-mm soda-lime glass pane sample.
Figure 10:
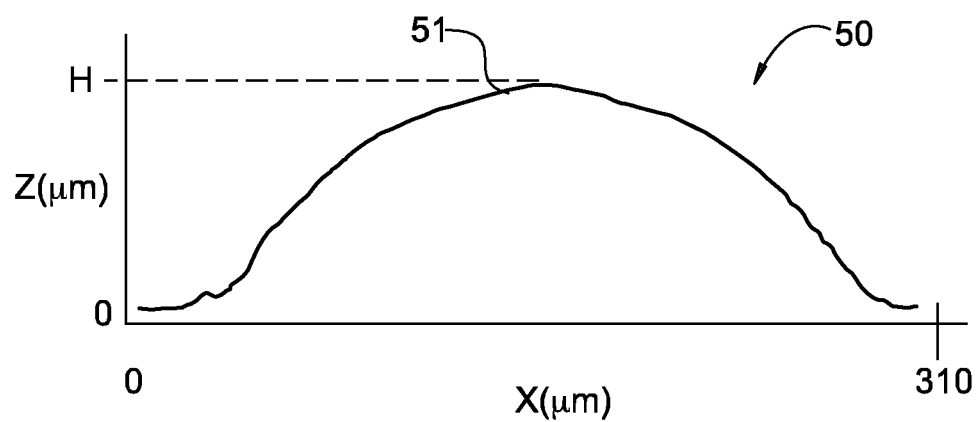
FIG. 10 is a line scan of the glass-bump spacer of FIG. 9, revealing a substantially hemispherical profile.

FIG. 9 is a three-dimensional image of a glass-bump spacer 50 formed in a soda-lime glass pane having a thickness $T_G$=3 mm. FIG. 10 is a line-scan of glass-bump spacer 50 of FIG. 9. The line scan reveals that glass-bump spacer 50 has a substantially hemispherical shape, a bump height H of about 75 µm and a base diameter $D_B$ of about 250 µm.

Figure 11:
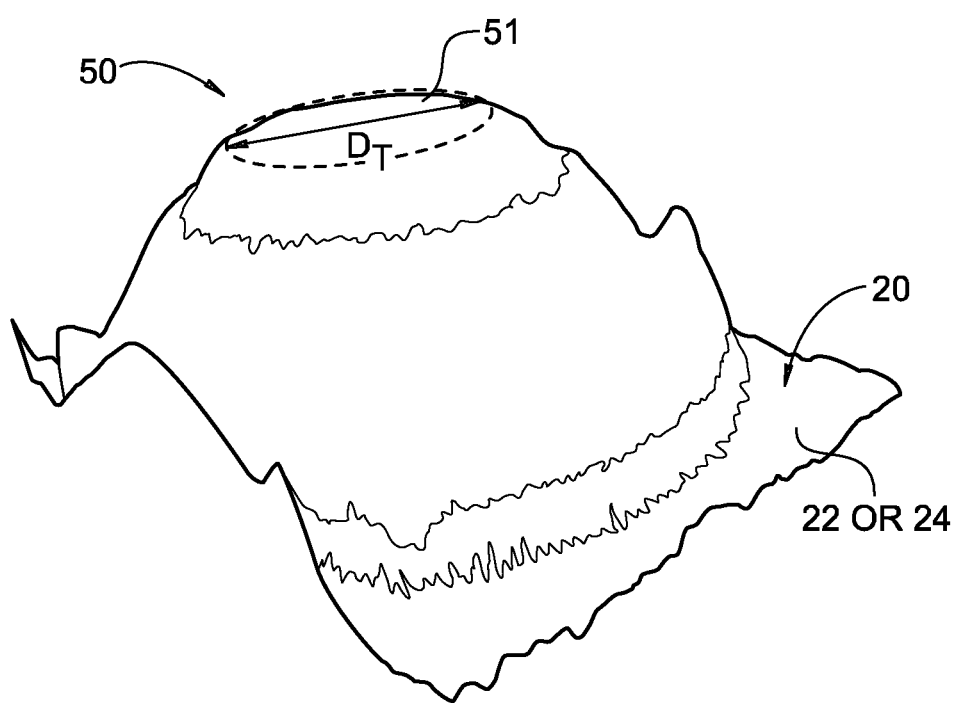
FIG. 11 is a three-dimensional image of a glass-bump spacer similar to that shown in FIG. 9, except that the glass-bump spacer has a substantially flat top portion.

FIG. 11 is a three dimensional image of a glass-bump spacer 50 similar to that shown in FIG. 9, except that a growth-limiting surface in the form of a glass plate was placed adjacent glass pane surface 24 and then the glass pane irradiated as per above. The resulting glass-bump spacer 50 grew to a certain bump height H and then this growth was limited by the adjacent glass plate. The result was a glass-bump spacer 50 having a substantially flat top portion 51 with a diameter $D_T$. In this way, the size, height and shape of glass-bumps 50 can be controlled to some degree, and in particular the diameter $D_T$ (and thus the surface area) of substantially flat top portion 51 can be controlled. In an example embodiment, substantially flat top portion 51 has a substantially circular shape so that its surface area SA is well approximated by the relationship $SA = \pi [D_T/2]^2$. The total contact area $SA_T$ presented by a set of n glass-bump spacers 50 is approximated by $SA_T = \pi n [D_T/2]^2$.

The size, shape and height of glass-bump spacers 50 can be more accurately controlled by using more complicated growth-limiting configurations or by altering the cross-sectional shape of focused laser beam 112F. An advantage of controlling bump height H is that it mitigates the variability in bump heights due to glass non-uniformity and minor laser instability. These two factors, if unchecked, can result in a bump-to-bump height variation in glass-bump spacers 50 of up to +/−5 μm. Another advantage of substantially flat-top glass-bump spacers 50 is the reduction (including the minimization) of mechanical stresses at the contact point between tip portions 51 and glass 20F.

Apparatus 100 enables glass-bump spacers 50 to have a hemispherical shape largely because the swelling of the glass that causes bump formation is controlled by the surface tension of the molten glass. This effect is exploited by using a focused laser beam 112F having a circularly symmetric cross-section. A rounded profile for glass-bump spacers 50 is advantageous in that it provides minimal total contact area $S_{AT}$ between the glass-bump spacers and the adjacent glass pane, thereby reducing the heat conductivity between the two glass panes. It is important to reduce (and preferably minimize) this heat transfer mechanism in VIG windows 10 because thermal insulation diminishes with increased total contact area $S_{AT}$. in the other hand, a very small contact area SA per glass-bump spacer 50 may lead to local stress concentration and can potentially damage the adjacent glass pane 20 and/or glass-bump spacers 50. As discussed above in connection with FIG. 11, glass-bump spacer 50 can have a substantially flat top portion 51 whose size (i.e., diameter $D_T$ and thus contact area SA) can be controlled.

In an example embodiment of VIG window 10, the total contact area $SA_T$ is selected to increase and preferably optimize the thermal insulation. It is estimated that for glass-bump spacers 50 having a base diameter $D_B$ in the range from about 300 μm to about 700 μm, the substantially flat top portion 51 preferably has a "top" diameter $D_T \leq 100$ μm, more preferably $D_T \leq 75$ μm, and even more preferably $D_T \leq 50$ μm.

To assess the visibility of laser-grown glass-bump spacers 50 in VIG window 10 versus that of discrete spacers used in conventional VIG windows, several photos were taken at different tilt angles relative to the surface normal of the VIG window. While glass-bump spacers 50 were visible when viewed at glazing incident angles, they became practically invisible at the more usual near-incident viewing angles. The photos of VIG window 10 were then compared to photos taken under virtually identical conditions for a commercial window pane having discrete ceramic spacers. The discrete ceramic spacers were much more visible, particularly at the usual, near-incident viewing angles.

As shown in FIG. 4A, in an example embodiment, glass-bump spacers 50 are formed in both sides 22M and 24M of middle glass pane 20M to form triple-pane VIG window 10 shown therein. Double-side glass-bump spacers 50 are formed in one example embodiment by altering the irradiation conditions as compared with forming single-side bumps. By way of example, in one approach glass-bump spacers 50 are formed in one side 22M of glass pane 20M, and then the glass pane is turned over and more glass-bumps are formed in the other side 24M. In this embodiment, it may be necessary to slightly displace the two sets of glass-bump spacers 50 formed in the respective sides of middle glass pane 20M to avoid irradiating the previously formed glass-bump spacers. The amount of this displacement is, for example, equal to or up to about twice the base diameter $D_B$, which is typically in the order of 200 μm to 700 μm and is thus quite small when compared to the size of a typical VIG window 10.

It is anticipated that the use of integrally formed glass-bump spacers 50 for VIG windows 10 will be more cost effective than disposing and fixing discrete (i.e., non-integral) spacers to a glass pane. This is largely because the present invention obviates the need for equipment and processes for placing discrete spacers in precise positions and keeping them in place while assembling the VIG window. Because of the smaller and controllable contact area SA between the tip portion 51 of glass-bump 50 and adjacent glass pane 20, heat transfer through VIG window 10 via thermal conduction is reduced (and preferably minimized) relative to the use of discrete spacers. Cost advantages become even more evident in the case of manufacturing a triple-pane VIG window, where handling and placement of the discrete spacers is quite challenging.

Example embodiments of VIG window 10 employ glass panes 20 having different material compositions. For example, one glass pane 20 (e.g., back glass pane 20B in FIG. 2) is formed from a first glass type and another glass pane (e.g., front glass pane 20F) is formed from a second glass type. For example, the first glass type is soda-lime window glass while the second glass type is a sodium aluminosilicate glass (e.g., 1317, 2317, and others), or vice versa.

Furthermore, in an example embodiment of VIG window 10, one glass pane 20 is thicker (e.g., 3 mm to 6 mm) to provide structural strength, while the other glass pane has a higher swelling capability and is thinner (e.g., 1 mm to 2 mm) to minimize the total thickness and weight of VIG window 10.

Glass-bump formation experiments conducted in sodium aluminosilicate glass 1317 ("1317 glass") revealed a high degree of swelling capability, with bump heights H of 155 μm formed in a sample having a thickness $T_G$=1.3 mm. It is noted here that soda-lime window glass and 1317 glass have similar coefficients of thermal expansion (CTEs) of about 9 ppm/C.

In experiments conducted in "ultra-white" window glass panes 20 that have a very low iron content (and thus do not have a greenish tint), glass-bump spacers 50 with bump heights H of about 212 μm were formed using the above methods. Thus, in an example embodiment, glass-bump spacers 50 formed in low-iron content glasses have a bump height H in the range from 75 μm to 225 μm, more preferably in the range from 100 μm to 225 μm, and even more preferably in the range from 150 μm to 225 μm.

Figure 12:
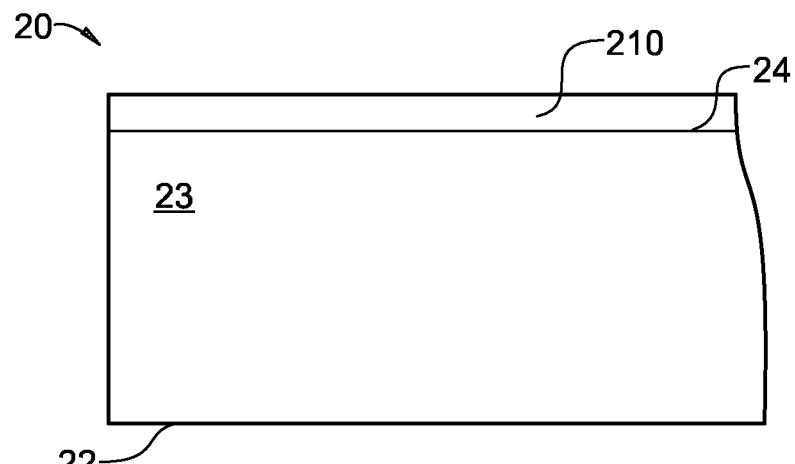
FIG. 12 is a schematic side view of an example glass pane having an infrared-reflective coating.

FIG. 12 is a schematic side view of an example glass pane 20 that has an infrared-reflective coating 210 in back surface 24. Such glass panes are useful in VIG windows because they further reduce the amount of transmitted heat.

Figure 13:
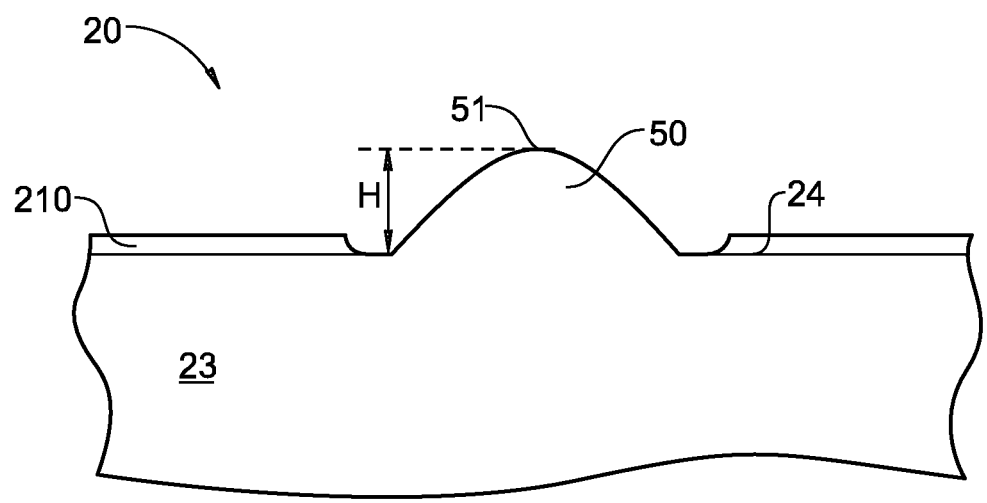
FIG. 13 is a close-up, cross-sectional view of an uncoated glass-bump spacer formed in the glass pane of FIG. 12.

FIG. 13 is a close-up cross-sectional view similar to that of FIG. 12, but for the IR-reflective glass pane 20 of FIG. 12, showing a glass-bump spacer 50 formed thereon. Since coating 210 has a much lower melting point than glass pane 20, it melts away from the vicinity of glass-bump spacer 50, leaving it uncoated. Any remnants of coating 210 are easily removed by cleaning back surface 24 using standard glass cleaning techniques.

VIG Window Formation

An aspect of the invention is directed to forming a VIG window, such as VIG window 10, using the methods of forming glass-bump spacers 50 as described above. Thus, with reference again to FIG. 1 and FIG. 2, an example method of forming a VIG window 10 includes forming, in a first (back) glass pane 20B comprising a first glass material, a plurality of glass-bump spacers 50 consisting of the first glass material from the first body portion 23. The method then includes bringing a second (front) glass pane 20F of a second glass material in contact with the first plurality of glass-bump spacers 50 so that the first and second glass panes are spaced apart by first distance $D_G$ between respective surfaces 24F and 24B, as shown in FIG. 2. The method then includes sealing at least respective portions of the first and second edges 28F and 28B with edge seal 30 to define interior region 40 between front and back glass panes 20F and 20B. Interior region 40 is then at least partially evacuated to form a vacuum pressure therein of less than one atmosphere. In a particular example embodiment, the first and second glass materials are the same.

The method of forming a three-pane VIG window 10 is similar to the formation of the two-pane VIG window and is now discussed with reference to FIG. 4A and FIG. 4B. With reference to FIG. 4A, in an example embodiment the formation of three-pane VIG window 10 involves forming two sets of glass-bump spacers in a middle ("first") glass pane 20M that resides between front (second) and back (third) glass panes 20F and 20B. Middle glass pane 20M thus has first and second pluralities (sets) of glass-bump spacers 50 in respective surfaces 22M and 24M. Middle glass pane 20M also has an outer edge 28M and is made up of a first glass material.

The method includes bringing the front and back glass panes 20F and 20B (made up of a second and third glass materials, respectively) in respective contact with the first and second plurality of glass-bump spacers 50 so that front middle and back glass panes 20F and 20M are spaced apart by a distance $D_{GA}$ between surfaces 24F and 22M, and so that middle and back glass panes 20M and 20B are spaced apart by a distances $D_{GB}$ between surfaces 24M and 24B. The method then includes sealing at least respective portions of the front, middle and back edges 28F, 28M and 28B of the three glass panes with one or more edge seals 30 (one edge seal 30 is shown in FIG. 4A). This serves to define first and second interior regions 40A and 40B between the front and middle glass panes 20F and 20M and the middle and back glass panes 20M and 20B, respectively. Interior regions 40A and 40B are then at least partially evacuated to form respective vacuum pressures therein of less than one atmosphere. In a particular example embodiment, the first, second and third glass materials are all the same.

In an alternate embodiment shown in FIG. 4B, rather than forming the second set of glass-bump spacers 50 in middle glass pane 20M, they are formed in the inner surface 24B of back glass pane 20B. Also, as shown in FIG. 4B, the method of forming triple-pane VIG window 10 alternately includes using one edge seal 30 to seal at least respective portions of edges 28F and 28M to form the vacuum seal for first interior regions 40A, and another edge seal to seal at least respective portions of edges 28M and 20B to form the vacuum seal for second interior region 40B.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

What is claimed is:

1. A vacuum-insulated glass (VIG) window, comprising:
   a first glass pane having a first body formed from a first glass material and having first opposite surfaces and a first outer edge;
   a second glass pane spaced apart from and disposed substantially parallel to the first glass pane at a first distance and having a second body formed from a second glass material and having second opposite surfaces and a second outer edge;
   a first edge seal formed around at least respective portions of the first and second outer edges so as to define a first sealed interior region between the first and second glass panes, wherein the first sealed interior region has a vacuum pressure of less than one atmosphere; and
   a first plurality of glass-bump spacers formed from the first glass pane from one of the first surfaces and consisting of the first glass material from the first body portion, and contacting the second glass pane so as to maintain said spaced apart first distance, wherein the other of the first surfaces in respective regions opposed to the first plurality of glass-bump spacers is substantially planar or comprises a further glass-bump spacer,
   wherein the first plurality of glass-bump spacers are formed by irradiating the first glass pane at locations on one of the first surfaces with a laser beam.

2. The VIG window of claim 1, wherein the first glass-bump spacers include respective substantially flat top portions that contact one of the second glass pane second surfaces.

3. The VIG window of claim 1, wherein the first glass-bump spacers have a bump height H defined by 75 µm≤H≤225 µm.

4. The VIG window of claim 3, wherein the bump height H is defined by 100 µm≤H≤170 µm.

5. The VIG window of claim 1, wherein the first and second glass materials are the same.

6. The VIG window of claim 1, wherein the first and second glass panes have respective thicknesses that are substantially the same.

7. The VIG window of claim 1, farther comprising:
   a third glass pane spaced apart from and disposed substantially parallel to the first glass pane in a side opposite the second glass pane and at a second distance, the third glass pane having a third body formed from a third glass material and having third opposite surfaces and a third outer edge;
   wherein either a) the first edge seal further surrounds at least a portion of the third outer edge to further define, between the first and third glass panes, a second sealed interior region having a vacuum pressure of less than one atmosphere, or b) a second edge seal surrounds at least respective portions of the first and third outer edges to further define, between the first and third glass panes, a second sealed interior region having a vacuum pressure of less than one atmosphere; and
   a second plurality of glass-bump spacers formed integrally in the first glass pane in the surface opposite that having the first plurality of glass--hump spacers, the second plurality of glass-hump spacers consisting of glass material from the first body portion, and contacting the third glass pane so as to maintain said spaced apart second distance.

8. The VIG window of claim 7, wherein the first, second and third glass materials are the same.

9. The VIG window of claim 1, further comprising:
a third glass pane spaced apart from and disposed substantially parallel to the first glass pane in a side opposite the second glass pane and at a second distance, the third glass pane having a third body thrilled from a third glass material and having third opposite surfaces and a third outer edge, with a second plurality of glass-bump spacers formed integrally in the third glass pane in the third surface adjacent the first glass pane, the second plurality of glass-bump spacers consisting of glass material from the third body, and contacting the first glass pane so as to maintain said spaced apart second distance; and
wherein either a) the first edge seal further surrounds at least a portion of the third outer edge to further define, between the first and third glass panes, a second sealed interior region having a vacuum pressure of less than one atmosphere, or b) a second edge seal surrounds at least respective portions of the first and third outer edges to further define, between the first and third glass panes, a second sealed interior region having a vacuum pressure of less than one atmosphere.

10. The VIG window of claim 9, wherein the first, second and third glass materials are the same.

11. A vacuum-insulated glass (VIG) window product formed by the process comprising:
providing a first glass pane having a first body portion with a first surface and a first edge and comprising a first glass material;
forming from the first glass pane first surface a plurality of glass-bump spacers that consist of the first glass material from the first body portion such that a first glass pane second surface remains substantially planar or convex following the forming in the first surface;
bringing a second glass pane having a second surface and a second edge and comprising a second glass material in contact with the glass-bump spacers so that the first and second glass panes are spaced apart by a first distance between the first and second surfaces;
sealing the first and second edges to define an interior region between the first and second glass panes;
forming a vacuum pressure of less than one atmosphere in the interior region,
wherein the step of forming further comprises a) irradiating the first glass pane at a location with a laser beam from a laser, wherein the laser beam passes through the first glass pane and has its focal point located outside of the first body portion and adjacent the first glass pane first surface; and terminating the irradiating to fix the glass-bump spacer; and
b) repeating act a) a plurality of times for different locations to form the plurality of glass-bump spacers.

12. The VIG window product of claim 11, wherein the process further comprises:
positioning a growth-limiting surface adjacent the first glass pane surface and growing the glass-bump spacers into the growth-limiting surface, thereby providing the plurality of glass-bump spacers with substantially flat top portions.

13. The VIG window product of claim 11, wherein the process further comprises:
providing the focused laser beam with light pulses having a temporal pulse width $\tau_P$ defined by $20\text{ ns} \leq \tau_P \leq 80\text{ ns}$, and a repetition rate R defined by $100\text{ kHz} \leq R \leq 200\text{ kHz}$.

14. The VIG window product of claim 11, wherein the process further comprises:
generating from the laser one of an ultraviolet-wavelength beam and a mid-infrared-wavelength beam.

15. The VIG window of claim 1, wherein the first and second glass panes are optically transparent.

16. The VIG window of claim 7 or 9, wherein the third glass pane is optically transparent.

17. The VIG window product of claim 11, wherein the first and second glass panes are optically transparent.

* * * * *